United States Patent
Tomio et al.

(10) Patent No.: US 6,334,592 B1
(45) Date of Patent: Jan. 1, 2002

(54) FLIGHT CONTROL APPARATUS FOR HELICOPTERS

(75) Inventors: Takeshi Tomio; Hideki Shirasaya; Shigeru Tobari; Ikuo Sudo; Yoshiharu Kubo, all of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/468,095

(22) Filed: Dec. 21, 1999

(30) Foreign Application Priority Data

Mar. 12, 1999 (JP) .................................................. 11-067527

(51) Int. Cl.⁷ .................................................. B64C 13/04
(52) U.S. Cl. .................................................. 244/221
(58) Field of Search .............................. 244/17.11, 17.13, 244/220, 221

(56) References Cited

U.S. PATENT DOCUMENTS

| | | |
|---|---|---|
| 4,035,705 A | 7/1977 | Miller |
| 4,198,017 A * | 4/1980 | Murray ........................ 244/83 G |
| 4,279,391 A * | 7/1981 | Adams et al. ............. 244/17.13 |
| 4,355,358 A | 10/1982 | Clelford et al. |
| 4,373,184 A | 2/1983 | Lambregts |
| 4,599,698 A | 7/1986 | Fischer et al. |
| 4,741,501 A * | 5/1988 | Clelford et al. ........... 244/17.13 |
| 4,758,958 A * | 7/1988 | von Gersdorff ............... 364/434 |
| 4,924,400 A * | 5/1990 | Post et al. ..................... 364/433 |
| 5,141,177 A * | 8/1992 | Wright et al. ............. 244/17.13 |
| 5,224,664 A * | 7/1993 | Adams, Sr. et al. ...... 244/17.13 |
| 5,428,543 A * | 6/1995 | Gold et al. .................... 364/433 |

FOREIGN PATENT DOCUMENTS

| | | |
|---|---|---|
| GB | 2 315 138 | 1/1998 |
| JP | 51-116600 | 10/1976 |
| JP | 56-131495 | 10/1981 |
| JP | 57-55409 | 4/1982 |
| JP | 59-209997 | 11/1984 |
| JP | 10-16892 | 1/1988 |
| JP | 7-28800 | 5/1995 |
| JP | 10-510782 | 10/1998 |
| WO | 96/19380 | 6/1996 |

* cited by examiner

*Primary Examiner*—Peter M. Poon
*Assistant Examiner*—Kevin Jakel
(74) *Attorney, Agent, or Firm*—Wenderoth, Lind & Ponack, L.L.P.

(57) ABSTRACT

A flight control apparatus for a helicopter is configured by: a control unit controlled by the pilot; a steering mechanism for generating an aerodynamic control force; a link mechanism for mechanically transmitting an amount of control Ma in the control unit to the steering mechanism, thereby driving the steering mechanism; an amount-of-control sensor for detecting the amount of control Ma in the control unit and for supplying a control signal Sa; a flight control law calculation unit for calculating a flight control law of the helicopter based on the control signal Sa, and for supplying a driving signal Sb for the steering mechanism; a difference calculation unit for subtracting the control signal Sa from the driving signal Sb, and for supplying a difference signal Sc; and a precision servo actuator unit for adding the amount of control Ma transmitted via the link mechanism, to an amount of difference Mc corresponding to the difference signal Sc. According to this configuration, the apparatus can be easily applied to a mechanical control transmission mechanism of an existing helicopter, and the characteristics and performance of the control transmission mechanism can be remarkably increased.

10 Claims, 7 Drawing Sheets

FLIGHT CONTROL APPARATUS FOR HELICOPTERS

BACKGROUND OF THE INVENTION

1. Field of the Invention

The invention relates to a flight control apparatus for helicopters for use in driving a steering mechanism on the basis of the amount of control performed by the helicopter's pilot.

2. Description of the Related Art

In flight of a helicopter, it is necessary to perform flight control with respect to four axes in total, i.e., a CP (collective pitch) axis corresponding to the thrust of a main rotor, a pitch axis corresponding to the inclination in the longitudinal direction of the airframe axis, a roll axis corresponding to the inclination in the transverse direction of the airframe axis, and a yaw axis corresponding to the heading (the thrust of a tail rotor). The pilot has to operate right/left hand control levers and right/left foot control pedals to control the direction of flight and the attitude of the helicopter while keeping the four axes in balance. Accordingly, a very sophisticated control technique is required of the pilot.

FIG. 8 is a diagram showing the configuration of an example of the prior art flight control apparatus for helicopters. This apparatus is a mechanical control transmission mechanism adopted in most of the existing helicopters. A control unit 1 including control levers and control pedals is coupled to a steering mechanism 4 for controlling the pitch angle of a blade, via a mechanical link mechanism 2, in which at some midpoint an actuator 3 for increasing the control force is interposed.

In such a mechanical control transmission mechanism, the amount of control in the control unit 1 is directly affected by the amount of driving of the steering mechanism 4. Accordingly, in some cases even a slight control error may largely disturb the balance among the four axes, so that a relatively heavy burden is put on the pilot. As a countermeasure, a stability augmentation system (SAS), an automatic flight control system (AFCS) or the like is added to the link mechanism 2, so that the flight stability and control response property of the helicopter are improved.

FIG. 9 is a diagram showing the configuration of another example of the prior art flight control apparatus for helicopters, which has an electrical control transmission mechanism under development. In the electrical control transmission mechanism, which is generally referred to as a fly by wire (FBW) system, a control unit 1 including control levers and control pedals is coupled to a steering mechanism 4 for controlling the pitch angle of blade, via wires for transmitting electric signals. At some midpoint are interposed an amount-of-control sensor 5 for detecting the amount of control, a computer 6 which carries out operation of various sensor signals to output a driving signal for each axis, and an actuator 3 for driving the steering mechanism 4 based on the driving signals.

In such an electrical control transmission mechanism, referring to the amount of control performed by the pilot, the computer 6 can generate driving signals optimum for the helicopter. In addition, in case where an unstable control signal is inputted due to a failure of a component, the computer 6 can remove the signal.

The mechanical control transmission mechanism has a relatively simple construction as compared with the electrical type and, accordingly, has a lower system failure rate than the electrical type (for a case where the failure rates are compared in the systems with the same redundancy (multiplicity)). As a result, the reliability of the mechanical type is higher. Because of the advantages, many mechanical types are practically used. However, the response type of the helicopter to the amount of control performed by the pilot is restricted to one type (i.e., a type in which the changing rate of airframe attitude is controlled). Therefore, the manner of stabilization by means of the stability augmentation system or automatic flight control system is limited to providing the function of adding dumping to the rate or of simply maintaining a constant attitude.

On the other hand, the electrical control transmission mechanism can realize any input and output system and calculation model using a computer. Thus, the response type of the helicopter to the amount of control performed by the pilot can be selected from among a plurality of flight control laws, so that the diversity of control modes can be increased. In addition, by performing optimum control in each control mode, the flight stability and control response property of the helicopter can be dramatically improved. However, the electrical control transmission mechanism is essentially different from the mechanical type, and therefore, it is difficult to practically use the electrical type in existing helicopters by modification, although it is possible to adopt the electrical type to newly developing helicopters.

SUMMARY OF THE INVENTION

It is hence an object of the invention to provide a flight control apparatus for helicopters, which can be easily applied to mechanical control transmission mechanisms that are mounted on many existing helicopters, and which can take advantages of the above-described characteristics of the electrical type control transmission mechanism, thereby remarkably increasing the characteristics and performance of the existing helicopters.

The invention provides a flight control apparatus for helicopters, comprising: a control unit operated by a pilot; a steering mechanism for generating an aerodynamic control force; a control transmission mechanism for mechanically transmitting an amount of control Ma in the control unit to the steering mechanism, to thereby drive the steering mechanism; an amount-of-control sensor for detecting the amount of control Ma in the control unit to output a control signal Sa; a flight control law calculation unit for calculating a flight control law of a helicopter based on the control signal Sa to output a driving signal Sb for the steering mechanism; a difference calculation unit for subtracting the control signal Sa from the driving signal Sb to output a difference signal Sc; and a servo actuator unit for adding an amount of difference Mc corresponding to the difference signal Sc, to the amount of control Ma transmitted via the control transmission mechanism.

According to the invention, the amount of control Ma in the control unit is transmitted to the steering mechanism via the control transmission mechanism, so that the same operation as that of the prior art mechanical control transmission mechanism is performed. In addition, the amount-of-control sensor detects the amount of control Ma in the control unit, and supplies the control signal Sa to the flight control law calculation unit for calculating the flight control law of the helicopter.

In the same manner as the prior art electrical control transmission mechanism, the flight control law calculation unit can perform a model calculation corresponding to various flight control laws by using the full operational range (full-authority) of the control system based on the control signal Sa. A result of the calculation is outputted as a driving signal Sb for the steering mechanism, and the driving signal Sb is a driving signal optimum for the helicopter. However, in the case where the driving signal Sb is directly supplied to the servo actuator unit, such a problem occurs that the amount of control Ma, which has been already supplied to the steering mechanism via the control transmission mechanism, serves as an excess with respect to the amount of driving Mb of the steering mechanism. Thus, the difference calculation unit subtracts the control signal Sa from the driving signal Sb, and supplies the obtained difference signal Sc to the servo actuator unit, so that the amount of driving Mb of the steering mechanism does not include the excess amount of control Ma.

Accordingly, part of the amount of driving Mb of the steering mechanism reflects the amount of control Ma in the control unit, and the remaining part of the amount of driving Mb reflects the calculation result of the flight control law calculation unit. According to the invention, while the reliability of the prior art mechanical control transmission mechanism is always maintained, sophisticated technological flight control laws by the prior art electrical control transmission mechanism can be applied. The characteristics and performance of the control transmission mechanism are remarkably enhanced as a whole, and the flight stability and control response property of the helicopter are dramatically improved.

When relationship between a mechanical amount M and an electrical amount S is represented by a function of M=f(S), the relationship in the control unit is represented by a function of Ma=f(Sa), and that in the servo actuator unit is represented by a function of Mc=f(Sc). Since the relationship of Sc=Sb−Sa is established, the amount of driving Mb of the steering mechanism is obtained as follows:

$$Mb = Ma + Mc$$
$$= Ma + f(Sc)$$
$$= Ma + f(Sb - Sa)$$
$$= Ma + f(Sb) - f(Sa)$$
$$= f(Sb)$$

From the above, it will be seen that the amount of driving Mb of the steering mechanism coincides with the driving signal Sb of the flight control law calculation unit.

Although the description concerns the control for one axis, the invention can be applied to the control relating to all or part of four axes, i.e., a pitch axis, a roll axis, a yaw axis, and a CP axis.

In a mechanical control transmission mechanism which is mounted on many existing helicopters, a flight control function equivalent to the FBW system can be easily realized only by performing modification of adding the amount-of-control sensor, flight control law calculation unit, difference calculation unit and servo actuator unit according to the invention.

In the invention it is preferable that the servo actuator unit is disposed functionally in series to the control transmission mechanism.

According to the invention, the process of summing the amount of control Ma transmitted via the control transmission mechanism and the amount of difference Mc outputted from the servo actuator unit can be easily realized.

In the invention it is preferable that in the event a failure of the flight control law calculation unit occurs, the servo actuator unit is locked after eliminating a deviation Mc between the amount of control Ma and the amount of driving Mb of the steering mechanism.

According to the invention, when the flight control law calculation unit is normal, the sum of the amount of control Ma from the control unit and the amount of difference Mc from the servo actuator unit is supplied to the steering mechanism, so as to properly maintain the amount of driving Mb. When the flight control law calculation unit fails, there arises a deviation between the amount of control Ma and the amount of driving Mb, corresponding to the amount of difference Mc immediately after the failure. Therefore, the pilot is impelled to continuously perform the control in a condition where the pilot feels the deviation between the position sense of the control portion (levers and pedals) in the control unit and the controllable range of the helicopter. This exerts a heavy burden on the pilot. To solve this problem, in the event a failure of the flight control law calculation unit occurs, the operating section of the servo actuator is once locked under the condition that the deviation Mc between the amount of control Ma and the amount of driving Mb of the steering mechanism is kept fixed. The pilot is allowed to perform the initial counter measure control under this state, so as to assure safety. The lock is released by an instruction (switching) by the pilot after the correction control to eliminate the deviation Mc. Thereafter, the operating section of the servo actuator unit is again locked. The position sense of the control portion in the control unit thus agrees with the controllable range of the helicopter. The pilot can continue the control by the same control method as that in the prior art mechanical control transmission mechanism, so that the burden on the pilot can be largely reduced.

In the invention it is preferable that a power boost unit having an SAS function which effectively functions only in the event a failure of the flight control law calculation unit occurs is disposed between the servo actuator unit and the steering mechanism.

According to the invention, even in the case where the use of the flight control law calculation unit is stopped because of a failure or the like, the control transmission mechanism SAS (stability augmentation system) function can be incorporated therein as a substitute function, so that the flight stability and control response property of the helicopter can be continuously ensured.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
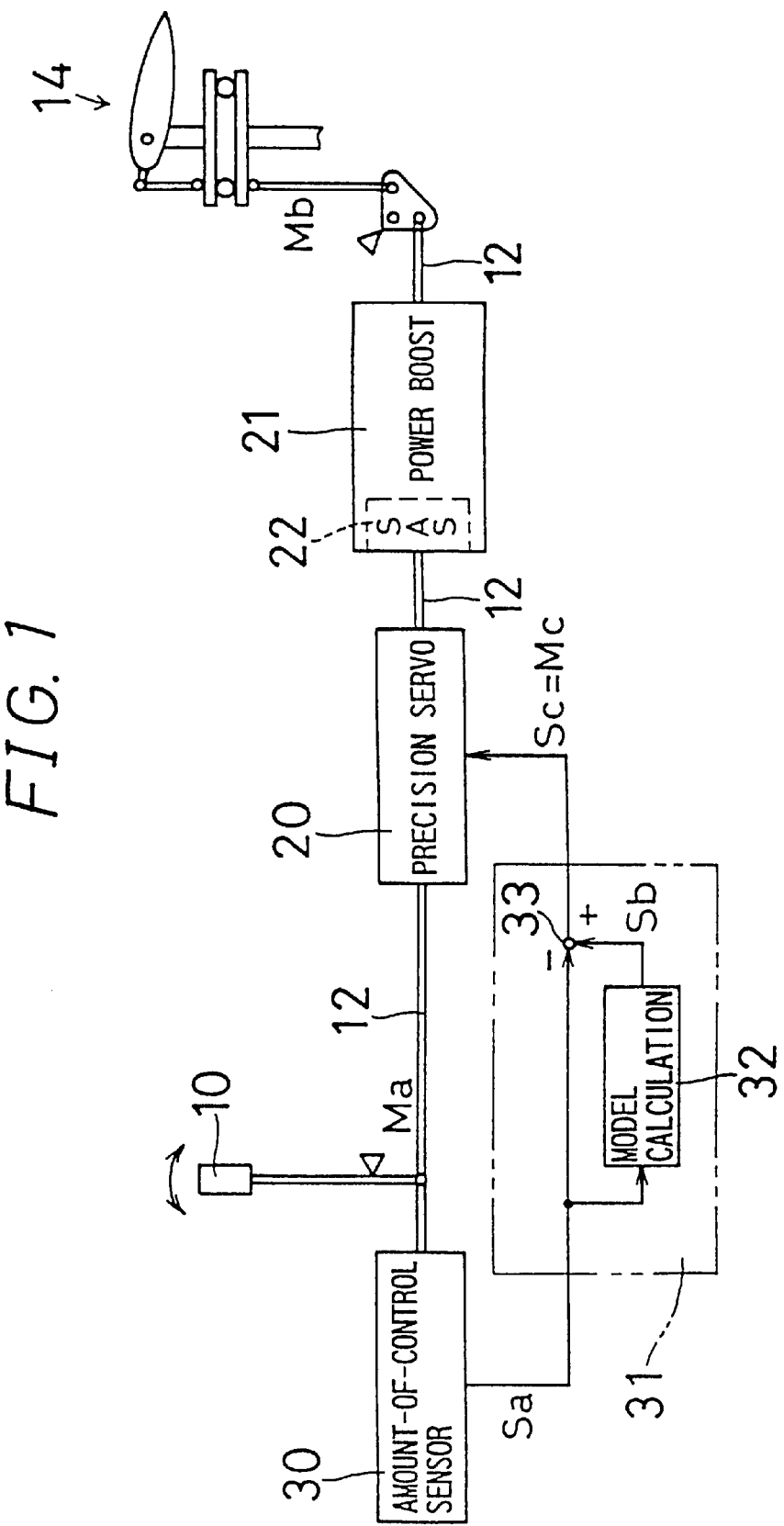
FIG. 1 is a diagram showing the configuration of an embodiment of the invention.

Now referring to the drawings, preferred embodiments of the invention are described below.

FIG. 1 is a diagram showing the configuration of an embodiment of the invention. A flight control apparatus for helicopters has a hybrid construction including a mechanical control transmission mechanism and an electrical control transmission mechanism.

First, the mechanical control transmission mechanism will be described. A control unit 10 including control levers and/or control pedals, operated by the pilot, is coupled to a mechanical link mechanism 12, to be finally coupled to a steering mechanism 14. The steering mechanism 14 controls a pitch angle of a blade of a main rotor or a tail rotor, and controls aerodynamic control force, so as to control a flight direction and attitude of a helicopter.

At some midpoint in the link mechanism 12, are arranged in series a precision servo actuator unit 20 for superimposing a signal from the electrical control transmission mechanism (described later) on the mechanical control transmission mechanism, and a power boost unit 21 for increasing the control force. An SAS apparatus 22 for enhancing the stability of the airframe attitude is integrally incorporated into the power boost unit 21. When a flight control computer 31 is normal, the SAS apparatus 22 is in an off-state. Only when a failure of the flight control computer 31 occurs and flight control is performed only by the mechanical control transmission mechanism, the SAS apparatus 22 starts to function.

Next, the electrical control transmission mechanism will be described. A detecting portion of an amount-of-control sensor 30 is coupled to the control unit 10. The sensor 30 detects an amount of control Ma performed by the pilot and outputs a control signal Sa. The flight control computer 31 comprises: a flight control law calculation unit 32 for executing model calculations in accordance with an ideal helicopter flight control model (flight control laws) which is previously incorporated, based on the control signal Sa and signals from various sensors, and for outputting a driving signal Sb; and a difference calculation unit 33 for subtracting the control signal Sa from the driving signal Sb to output a difference signal Sc.

The flight control laws for helicopters are generally classified, for example, into 1) normal mode and 2) backup mode. The 1) normal mode is classified into 1a) attitude mode in which the attitude of a helicopter changes in response to control inputs and is maintained when there is no control input, and 1b) rate mode in which the attitude change rate of the helicopter changes in response to the control inputs and the attitude is maintained when there is no control input. The 2) backup mode is classified into 2a) direct link mode in which an electric signal system is simply substituted for the conventional mechanical system, and 2b) damper mode in which angular velocity signal feedback is added to the direct link mode, so as to enhance the stability. The pilot performs the helicopter control by selecting one of the plural flight control modes.

The precision servo actuator unit 20 has a function of arbitrarily adjusting a distance between an input portion coupled to the preceding link mechanism 12 and an output portion coupled to the succeeding link mechanism 12. In the embodiment, an amount of difference Mc corresponding to the difference signal Sc is added to the amount of control Ma transmitted via the link mechanism 12.

Next, the operation will be described. When the pilot operates the control unit 10, the amount of control Ma is transmitted to the steering mechanism 14 through the link mechanism 12, the precision servo actuator unit 20, and the power boost unit 21.

The amount-of-control sensor 30 detects the amount of control Ma in the control unit 10, and supplies the control signal Sa to the flight control computer 31. The flight control law calculation unit 32 performs a flight model calculation based on a predetermined flight control mode selected by the pilot and the control signal Sa, so as to output the driving signal Sb for the steering mechanism 14. The difference calculation unit 33 supplies to the precision servo actuator unit 29 the difference signal Sc which is obtained by subtracting the control signal Sa from the driving signal Sb. The precision servo actuator unit 20 converts the difference signal Sc into the control difference amount Mc, and adds the control difference amount Mc to the control amount Ma transmitted via the link mechanism 12. Accordingly, an amount of driving Mb for the steering mechanism 14 equals to the sum of the amount of control Ma and the amount of difference Mc. As for the amount of difference Mc, an amount corresponding to the amount of control Ma is previously removed in the difference calculation unit 33. Thus, the amount of driving Mb coincides with the driving signal Sb outputted from the flight control law calculation unit 32.

In this way, it is possible to combine high technological flight control laws using the electrical control transmission mechanism while maintaining the control method using the mechanical control transmission mechanism. The characteristics and the performance of the control transmission mechanism are remarkably enhanced as a whole, and the flight stability and control response property of the helicopter can be dramatically improved.

Although the control for one axis has been described in the above, the invention can be applied to the control for all or part of four axes, i.e., a pitch axis, a roll axis, a yaw axis, and a CP axis.

Figure 2:
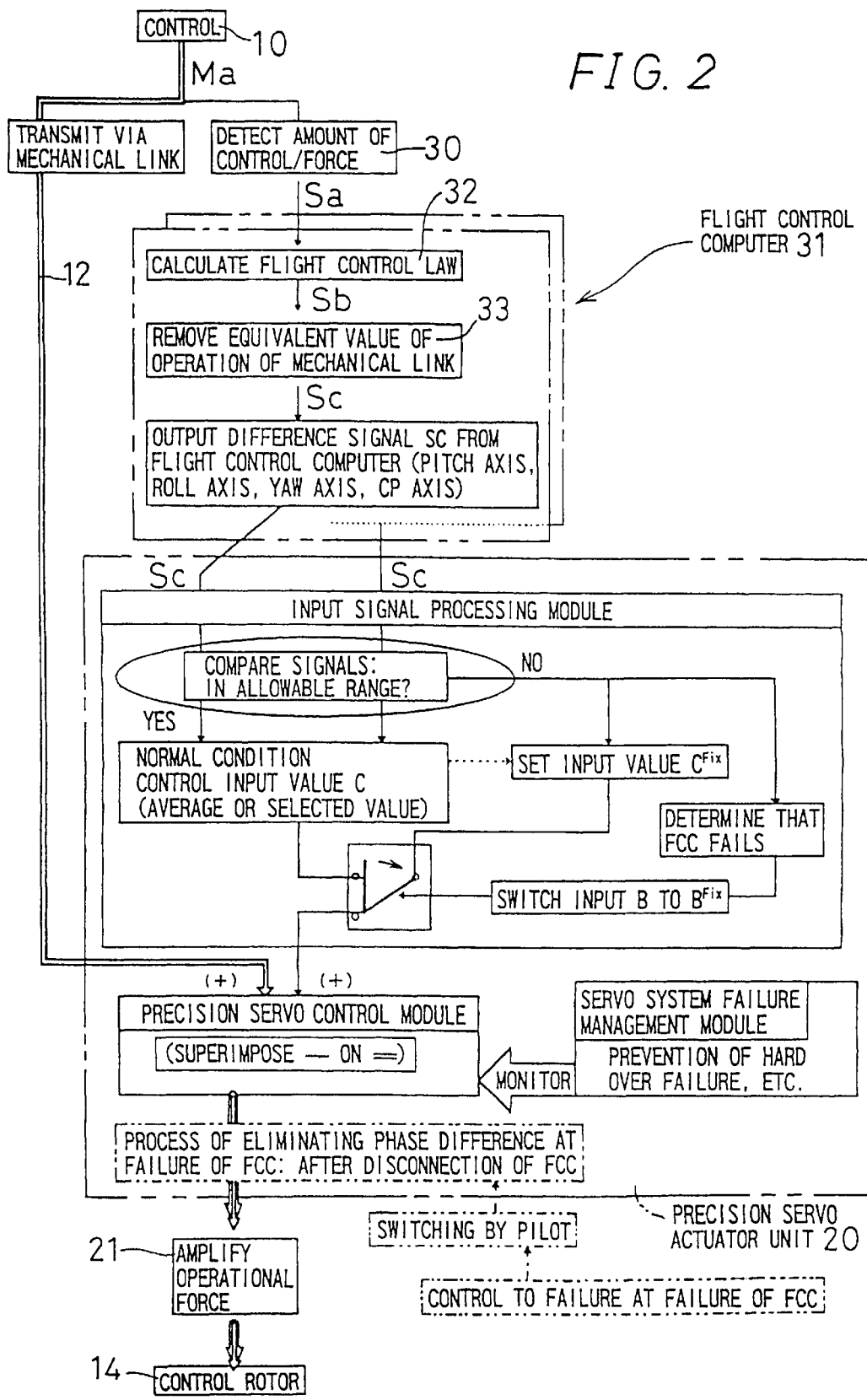
FIG. 2 is a flowchart showing an operational example of the invention.

FIG. 2 is a flowchart showing an operational example of the invention. The amount of control Ma in the control unit 10 is transmitted to a precision servo control module in the precision servo actuator unit 20 via a mechanical link such as the link mechanism 12. The amount-of-control sensor 30 detects the amount of control Ma, and supplies the amount of control Ma to the flight control computer 31.

A pair of the flight control computers 31 constitute a duplicate redundant safety system, and each performs flight model calculation and subtraction processing of the amount of control Ma, to output the difference signals Sc for the pitch axis, the roll axis, the yaw axis, and the CP axis.

The precision servo actuator unit 20 in the next stage includes an input signal processing module, the precision servo control module, and a servo system failure management module. In the input signal processing module, two difference signals Sc supplied from the duplicate flight control computers 31 are compared with each other, and it is judged whether the difference therebetween is within an allowable range or not. When the difference is within the allowable range, it is determined that the flight control computer 31 is operating normally. One of the difference signals Sc or the average of the signals is adopted as a normal condition control input value C, and the value is supplied to the precision servo control module.

In the precision servo control module, the control input value C corresponding to the difference signal Sc is superimposed on the amount of control Ma, and the resulting amount is transmitted to the steering mechanism 14 which performs rotor pitch angle control and the like, via the power boost unit 21 for amplifying the operational force. The servo system failure management module monitors the precision servo control module, so as to prevent a hard over failure and the like from occurring.

Next, the case where the flight control computer 31 fails will be described. If the difference between the two difference signals Sc outputted from the duplicate flight control computers 31 is out of the allowable range, it is determined that one of the duplicate flight control computers 31 has failed. The control input value C in the normal condition immediately before the failure is adopted, and a fixed value Cfix is set. Thereafter, the input value is switched to the fixed value Cfix and then supplied to the precision servo control module. According to this configuration, an airframe attitude change (transient) due to the failure can be prevented from occurring, and the failure can then be separated. The pilot is informed of the occurrence of a failure of the flight control computer 31 by a warning lamp or the like, and the pilot performs predetermined operations required in the failure condition.

Figure 3A:
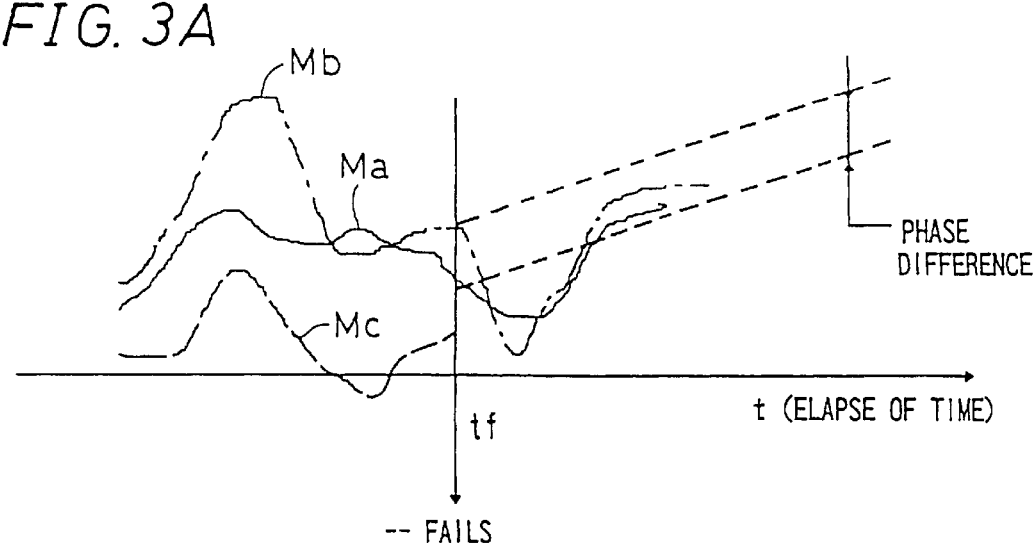
FIG. 3A is a graph showing an example of temporal variations in amount of control Ma, amount of driving Mb, and amount of difference Mc.
Figure 3B:
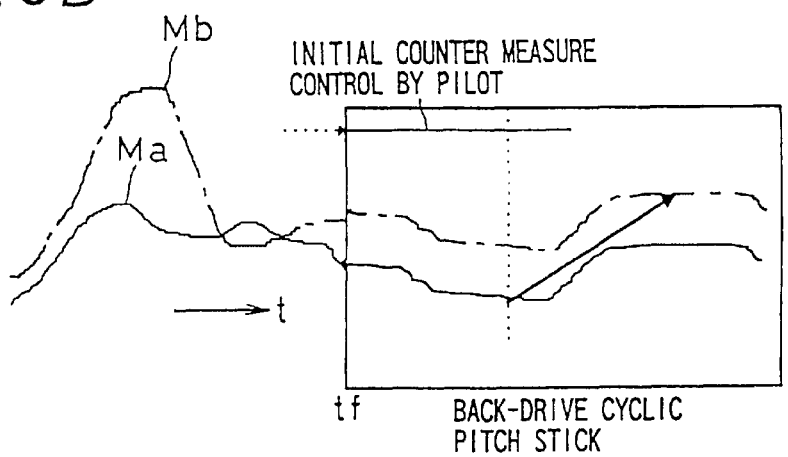
FIGS. 3B and 3C are graphs showing processing contents in the occurrence of failure.
Figure 3C:
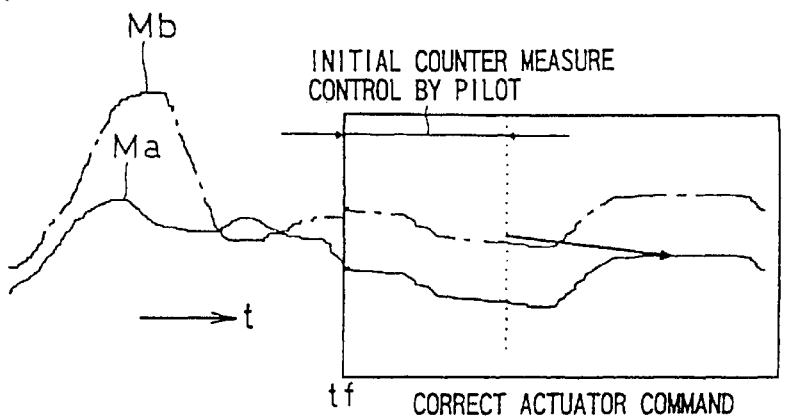

FIG. 3A is a graph showing an example of temporal variations in the amount of control Ma, the amount of driving Mb, and the amount of difference Mc. FIGS. 3B and 3C are graphs showing processing contents in the occurrence of a failure. Referring to FIG. 3A, first, the amount of difference Mc corresponding to the difference signal Sc from the flight control computer 31 is superimposed on the amount of control Ma input by the pilot, and the amount of driving Mb is supplied to the steering mechanism 14.

When the occurrence of a failure of the flight control computer 31 is detected, the amount of difference Mc is fixed to a value immediately before the failure. At the same time, a phase difference corresponding to the amount of difference Mc immediately after the failure is generated between the amount of control Ma and the amount of driving Mb. The phase difference is sensed by the pilot as a deviation of the position sense of the control unit from the controllable range of the helicopter, and results in the feeling of great disorder which interferes with the control.

As a countermeasure, as shown in FIG. 3B, after a time period required for the initial counter measure control for a failure by the pilot elapses from the occurrence of the failure, back-drive is applied to the control unit 10 by using the instruction (switching) from the pilot as a starting point, so that the amount of control Ma is gradually made closer to the amount of driving Mb. Finally, the amount of control Ma is made coincident with the amount of driving Mb, and then the operating portion of the precision servo control module is locked (i.e., the operating position is maintained). Thus, the feeling of disorder of the pilot can be eliminated, and the pilot can proceed with the control by the same control method as in the case where the prior art mechanical control transmission mechanism is used. Accordingly, the burden on the pilot can be largely reduced.

As another countermeasure, as shown in FIG. 3C, after a time period required for the initial counter measure control for a failure by the pilot elapses from the occurrence of the failure, an actuator command to the precision servo control module is corrected, and the amount of driving Mb is gradually made closer to the amount of control Ma. Finally, the amount of control Ma is made coincident with the amount of driving Mb. Thereafter, the operating portion of the precision servo control module is locked. Thus, the feeling of disorder of the pilot can be eliminated, and the pilot can proceed with the control by the same control method as in the case where the prior art mechanical control transmission mechanism is used. Accordingly, the burden on the pilot can be largely reduced.

When the control is performed with only the mechanical control transmission mechanism, the SAS apparatus 22 starts to operate, so that the flight stability and the control response property of the helicopter can be continuously ensured.

Figure 4:
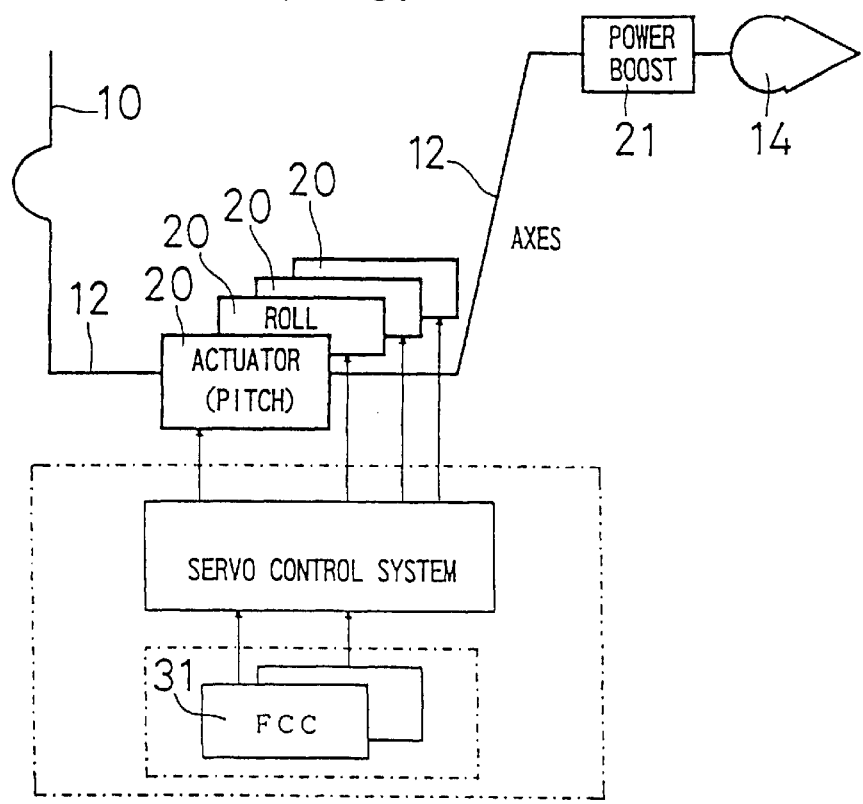
FIG. 4 is a diagram showing the configuration of another embodiment of the invention.

FIG. 4 is a diagram showing the configuration of another embodiment of the invention. The control unit 10, the link mechanism 12, the precision servo actuator unit 20, the power boost unit 21 and the steering mechanism 14 are disposed independently for the control system of each of the four axes, i.e., the pitch axis, the roll axis, the yaw axis, and the CP axis. The flight control computer (FCC) 31 and electric circuits such as the servo control system of the precision servo actuator unit 20 are accommodated in one case as one unit. According to this configuration, the number of components of the electrical control transmission mechanism is minimized, so that modification for applying the invention to an existing helicopter is minimized in scale. As a result, the exchange associated with the repair can be easily performed, and the maintenance property is enhanced.

Figure 5:
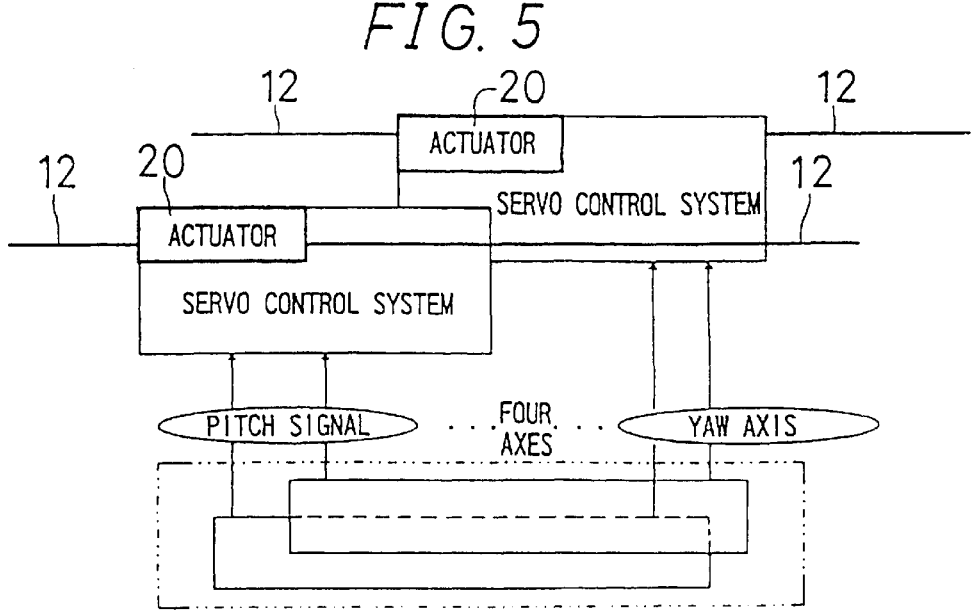
FIG. 5 is a diagram showing the configuration of a further embodiment of the invention.

FIG. 5 is a diagram showing the configuration of a further embodiment of the invention. The control unit 10, the link mechanism 12, the precision servo actuator unit 20, the power boost unit 21 and the steering mechanism 14 are disposed independently for the control system of each of the four axes, i.e., the pitch axis, the roll axis, the yaw axis, and the CP axis. In the precision servo actuator unit 20, a power boost unit and a precision servo control system are integrated as one unit. As a result, the exchange associated with the repair can be easily performed, and the maintenance property is enhanced.

Figure 6:
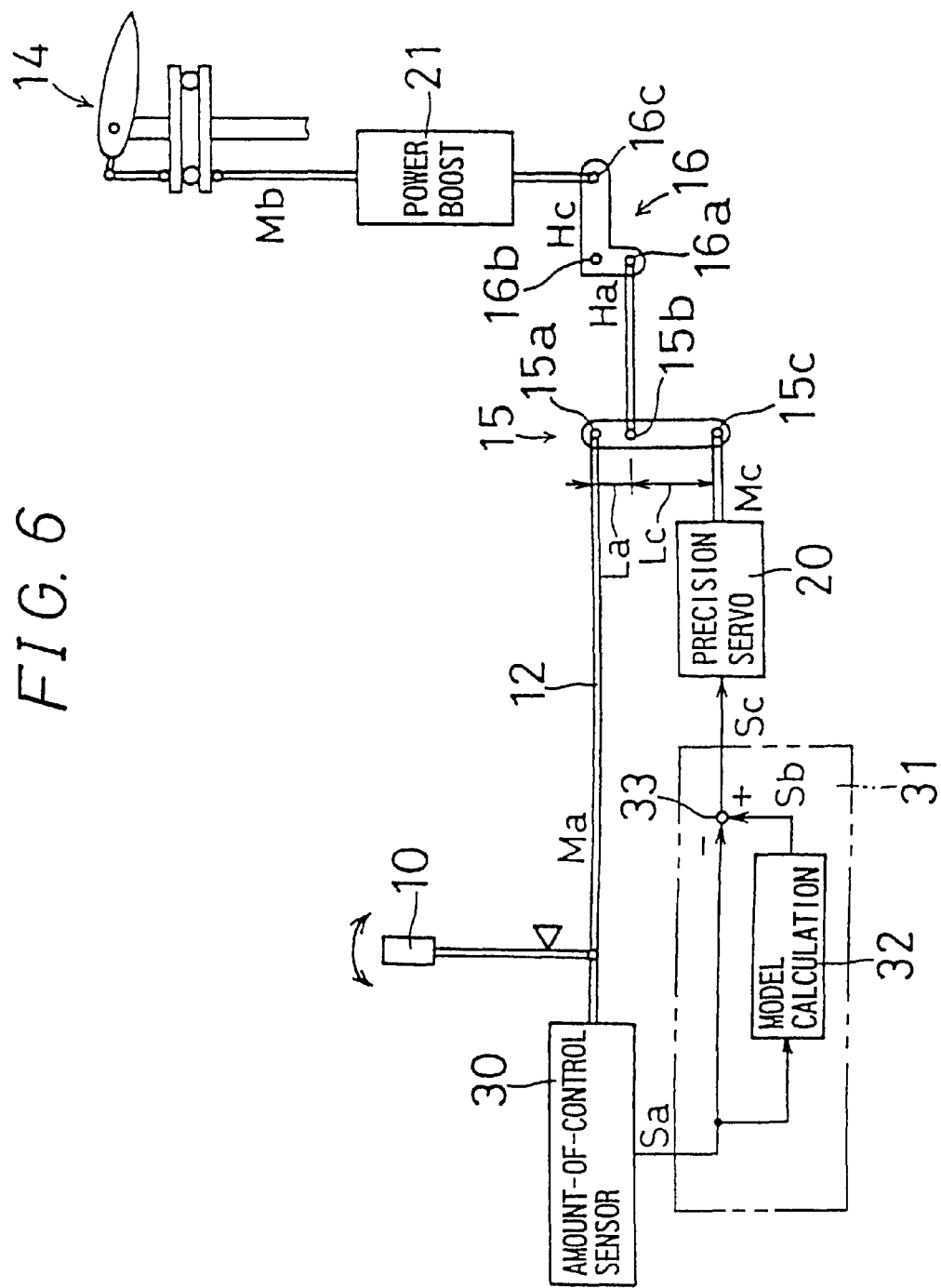
FIG. 6 is a diagram showing the configuration of a still further embodiment of the invention.

FIG. 6 is a diagram showing the configuration of a still further embodiment of the invention. In the same manner as FIG. 1, the flight control apparatus comprises the mechanical control transmission mechanism including the control unit 10, the link mechanism 12, the precision servo actuator unit 20, the power boost unit 21 and the steering mechanism 14, and the electrical control transmission mechanism including the amount-of-control sensor 30, the flight control computer 31 and the precision servo actuator unit 20 are provided. The precision servo actuator unit 20 is disposed parallel to the link mechanism 12. A synthesizing link mechanism 15 for synthesizing the amount of control Ma transmitted via the link mechanism 12 with the amount of difference Mc outputted from the precision servo actuator unit 20 is provided.

The synthesizing first link mechanism 15 includes a first supporting axis 15a coupled to the control unit 10, a second supporting axis 15b coupled to a succeeding link mechanism 16, and a third supporting axis 15c coupled to the precision servo actuator unit 20. An arm length La is defined as a distance between the first axis 15a and second supporting axis 15b. An arm length Lc is defined as a distance between the third axis 15c and second supporting axis 15b. The amount of control Ma is converted by a ratio of Lc/(La+Lc), and the amount of difference Mc is converted by a ratio of La (La+Lc). Then, the converted results are synthesized with each other. The amount of difference Mc is previously multiplied by (La+Lc)/La×Lc/(La+Lc).

The second link mechanism 16 in the subsequent stage includes a first supporting axis 16a coupled to the supporting axis 15b of the synthesizing link mechanism 15, a fixed second supporting axis 16b and a third supporting axis 16c coupled to the power boost unit 21. An arm length Ha is defined as a distance between the first supporting axis 16a and second supporting axis 16b. An arm length He is defined as a distance between the third supporting axis 16c and second supporting axis 16b. A ratio of He/Ha of the arm lengths is set so as to coincide with (La+Lc)/Lc.

By the provision of the link mechanism 16, the amounts of control Ma and Mc which have been reduced by the synthesizing first link mechanism 15 are returned to the original amounts, so that the amount of control Ma in the control unit 10 can be transmitted to the steering mechanism 14 at the equal magnification.

As described above, the precision servo actuator unit 20 is disposed mechanically in parallel and functionally in series (so as to add Ma to Mc) to the link mechanism 12. Accordingly, the apparatus can be easily incorporated into a mechanical control transmission mechanism which is mounted on many existing helicopters.

By adjusting the arm lengths La and Lc of the synthesizing link mechanism 15, a ratio involved in the mechanical control transmission mechanism and that involved in the electrical control transmission mechanism can be arbitrarily set, so that the degree of freedom in the flight control contents is increased.

Figure 7:
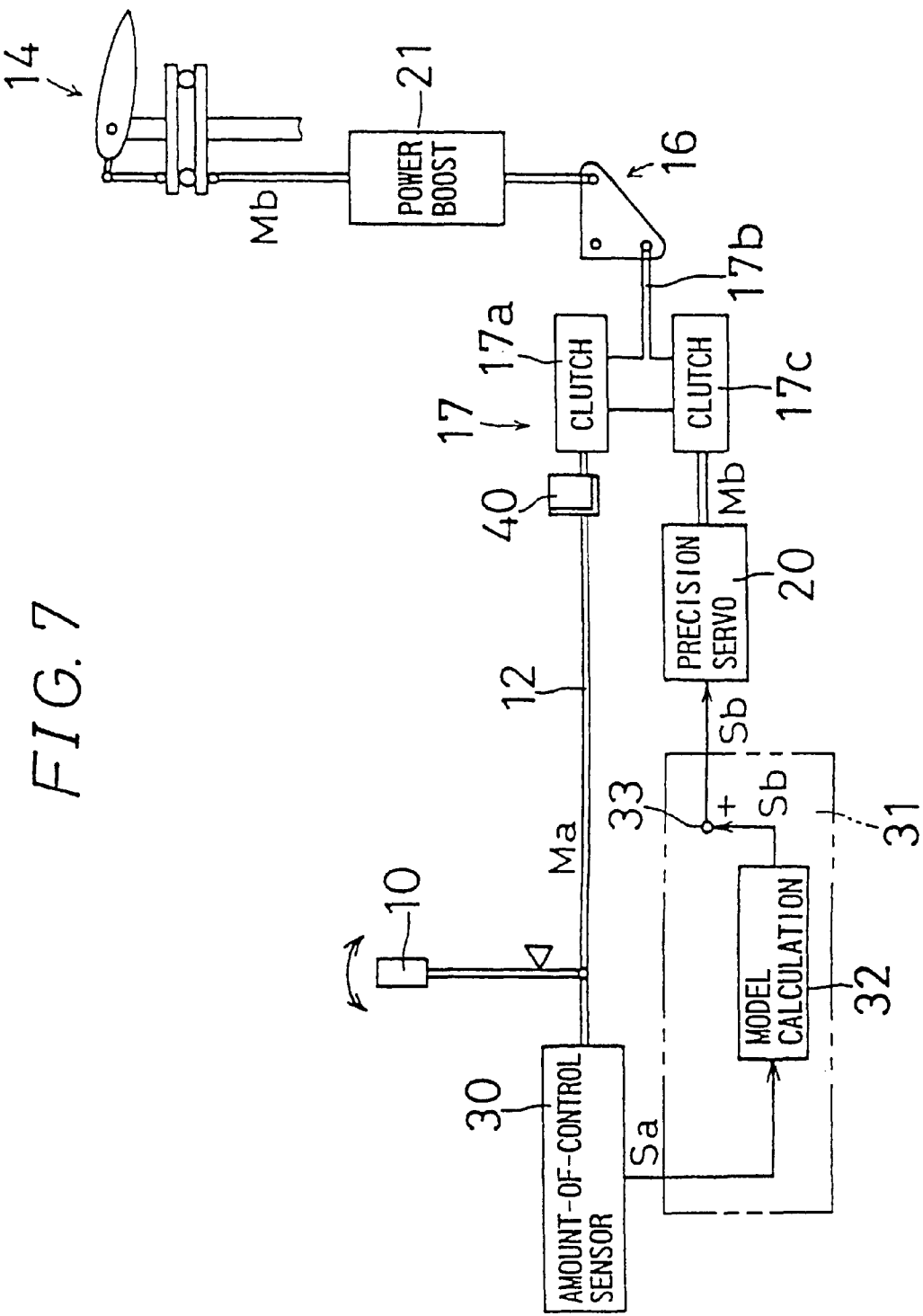
FIG. 7 is a diagram showing the configuration of a still further embodiment of the invention.
Figure 8:
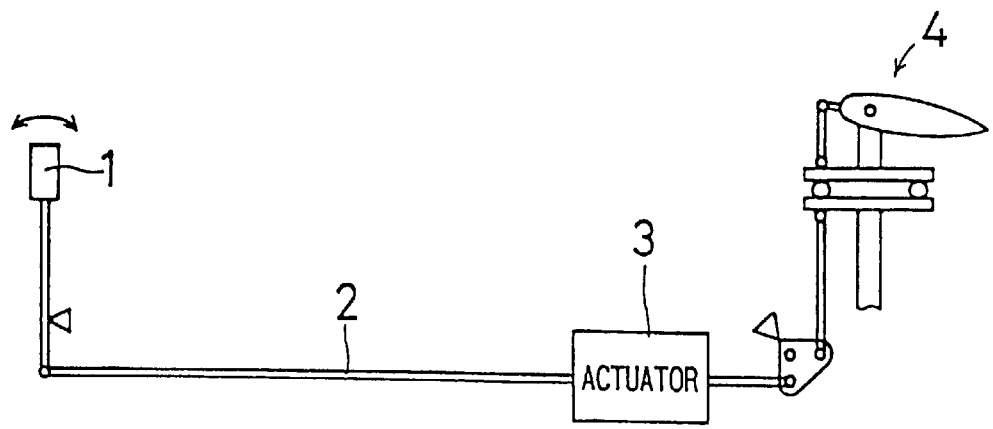
FIG. 8 is a diagram showing the configuration of an example of prior art flight control apparatus for helicopters.
Figure 9:
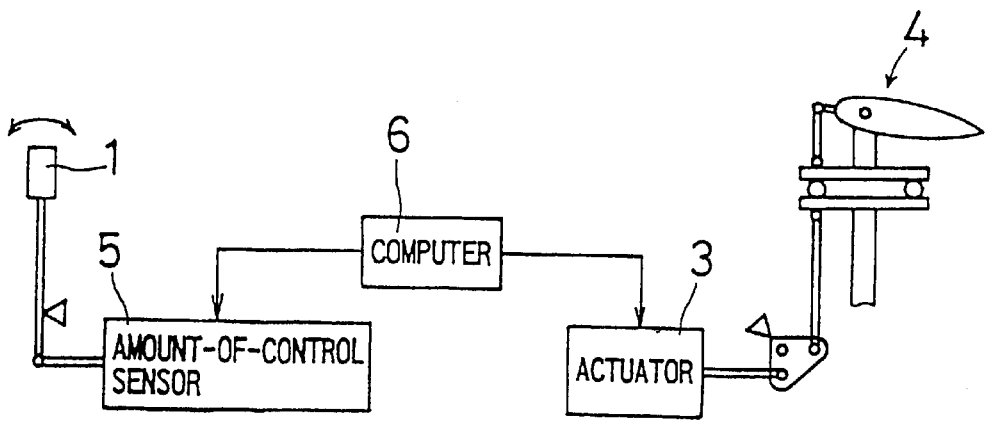
FIG. 9 is a diagram showing the configuration of another example of prior art flight control apparatus for helicopters.

FIG. 7 is a diagram showing the configuration of a still further embodiment of the invention. In the same manner as FIG. 1, the flight control apparatus comprises the mechanical control transmission mechanism including the control unit 10, the link mechanism 12, the precision servo actuator unit 20, the power boost unit 21 and the steering mechanism 14, and the electrical control transmission mechanism including the amount-of-control sensor 30, the flight control computer 31 and the precision servo actuator unit 20. The precision servo actuator unit 20 is disposed in parallel to the link mechanism 12, and provided with a transmission switching mechanism 17 for selectively transmitting both of or one of the amount of control Ma transmitted via the link mechanism 12 and the amount of difference Mc outputted from the precision servo actuator unit 20 to the steering mechanism 14.

The transmission switching mechanism 17 includes an output rod 17b coupled to the succeeding link mechanism 16, a clutch 17a for connecting or disconnecting the control unit 10 to or from the output rod 17b, and a clutch 17c for connecting to or disconnecting from the output rod 17b the precision servo actuator unit 20. The link mechanism 16 performs the change of transmission direction at the equal magnification.

Next, the operation of the transmission switching mechanism 17 will be described. In a normal condition in which the electrical control transmission mechanism is used in preference, the clutch 17a is turned off and the clutch 17c is turned on, so that the amount of control Ma transmitted via the link mechanism 12 is disregarded, and the amount of output Mb from the precision servo actuator unit 20 is transmitted to the steering mechanism 14. By contrast, when the electrical control transmission mechanism fails, the mechanical control transmission mechanism is used. The clutch 17a is turned on and the clutch 17c is turned off, so that the amount of output Mb from the precision servo actuator unit 20 is disregarded, and the amount of control transmitted via the link mechanism 12 is transmitted to the steering mechanism 14.

As described above, the precision servo actuator unit 20 is disposed in parallel to the link mechanism 12, so that the apparatus can be easily incorporated into a mechanical control transmission mechanism which is mounted on many existing helicopters.

In this configuration, a back-drive unit 40 is additionally provided which, when the flight control computer 31 fails, eliminates a deviation Mc between the amount of control Ma and the amount of driving Mb of the steering mechanism.

By the provision of the transmission switching mechanism 17, the mechanical control transmission mechanism and the electrical control transmission mechanism can be arbitrarily selected, so that the degree of freedom in the flight control contents is increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A flight control apparatus for helicopters, comprising:
a control unit to be operated by a pilot;
a steering mechanism for generating an aerodynamic control force;
a control transmission mechanism for mechanically transmitting a control amount from the control unit to the steering mechanism, to thereby drive the steering mechanism;
an amount-of-control sensor for detecting the control amount from the control unit and generating a control signal;
a flight control law calculation unit for calculating a flight control model of a helicopter based on the control signal and a predetermined flight control mode, and for generating a driving signal for the steering mechanism;
a difference calculation unit for subtracting the control signal from the driving signal so as to generate a difference signal; and
a servo actuator unit for adding a control difference amount to the control amount transmitted via the control transmission mechanism to generate a driving amount, wherein the control difference amount corresponds to the difference signal.

2. The flight control apparatus for helicopters of claim 1, wherein the servo actuator unit is disposed functionally in series with the control transmission mechanism.

3. The flight control apparatus for helicopters of claim 2, wherein the servo actuator unit is adapted to, in the event that a failure of the flight control law calculation unit occurs, maintain a steady operating position after eliminating the control difference amount between the control amount and the driving amount of the steering mechanism.

4. The flight control apparatus for helicopters of claim 3, further comprising a power boost unit having a stability augmentation system, the stability augmentation system being adapted to effectively function only in the event that a failure of the flight control law calculation unit occurs, the power boost unit being disposed between the servo actuator unit and the steering mechanism.

5. The flight control apparatus for helicopters of claim 1, wherein the servo actuator unit is adapted to, in the event that a failure of the flight control law calculation unit occurs, maintain a steady operating position after eliminating the control difference amount between the control amount and the driving amount of the steering mechanism.

6. The flight control apparatus for helicopters of claim 5, further comprising a power boost unit having a stability augmentation system, the stability augmentation system being adapted to effectively function only in the event that a failure of the flight control law calculation unit occurs, the power boost unit being disposed between the servo actuator unit and the steering mechanism.

7. The flight control apparatus for helicopters of claim 1, further comprising a pair of flight control computers, each of the pair of flight control computers including a flight control law calculation unit and a difference calculation unit for generating a difference signal, the servo actuator unit being adapted to compare the difference signal from each of the flight control computers and determine if a difference between each of the difference signals is within an allowable range.

8. The flight control apparatus for helicopters of claim 1, wherein the servo actuator unit is disposed functionally parallel to the control transmission mechanism, further comprising a transmission switch mechanism downstream of the servo actuator unit, the transmission switch mechanism including a first clutch connected to the control transmission mechanism, a second clutch connected to the servo actuator unit, and an output rod connected to a downstream end of the first clutch and a downstream end of the second clutch.

9. The flight control apparatus for helicopters of claim 1, wherein the servo actuator unit is disposed functionally parallel to the control transmission mechanism, further comprising a synthesizing first link mechanism downstream of the servo actuator unit, the first link mechanism including a first supporting axis connected to the control transmission mechanism, a second supporting axis connected to a downstream second link mechanism, and a third supporting axis connected to the servo actuator unit.

10. The flight control apparatus for helicopters of claim 9, wherein the second link mechanism is L-shaped, and an end of the L-shaped second link mechanism is connected to the second supporting axis of the first link mechanism.

* * * * *